(12) United States Patent  
Greenspun

(10) Patent No.: US 8,468,052 B2
(45) Date of Patent: Jun. 18, 2013

(54) SYSTEMS AND METHODS FOR PROVIDING ACTIVITY AND PARTICIPATION INCENTIVES

(75) Inventor: Daniel Alan Greenspun, Henderson, NV (US)

(73) Assignee: Vegas.com, LLC, Henderson, NV (US)

( * ) Notice: Subject to any disclaimer, the term of this patent is extended or adjusted under 35 U.S.C. 154(b) by 163 days.

(21) Appl. No.: 13/007,959

(22) Filed: Jan. 17, 2011

(65) Prior Publication Data

US 2012/0185310 A1 Jul. 19, 2012

(51) Int. Cl.
  *G06Q 30/00* (2012.01)
  *A63F 9/24* (2006.01)
  *A63F 13/00* (2006.01)
  *G06F 17/00* (2006.01)
  *G06F 19/00* (2011.01)

(52) U.S. Cl.
  USPC .............. 705/14.12; 705/14.1; 705/14.14; 705/14.27; 705/14.31; 705/14.36; 463/25; 463/42

(58) Field of Classification Search
  USPC ............ 705/14.1, 14.14, 14.27, 14.31, 14.36; 463/25, 42
  See application file for complete search history.

(56) References Cited

U.S. PATENT DOCUMENTS

| | | | |
|---|---|---|---|
| 4,912,310 A | 3/1990 | Uemura et al. | |
| 5,899,980 A | 5/1999 | Wilf et al. | |
| 6,408,281 B1 | 6/2002 | Shell et al. | |
| 6,775,371 B2 | 8/2004 | Elsey et al. | |
| 6,824,066 B2 | 11/2004 | Weyant | |
| 6,876,979 B2 | 4/2005 | Ling | |
| 7,032,817 B2 | 4/2006 | Blank | |
| 7,127,236 B2 | 10/2006 | Khan et al. | |
| 7,174,029 B2 | 2/2007 | Agostinelli et al. | |
| 7,174,563 B1 | 2/2007 | Brownlie et al. | |
| 7,239,226 B2 | 7/2007 | Berardi et al. | |
| 7,296,282 B1 | 11/2007 | Koplar et al. | |
| 7,315,823 B2 | 1/2008 | Bröndrup | |
| 7,398,225 B2* | 7/2008 | Voltmer et al. | 705/14.27 |
| 7,636,674 B2 | 12/2009 | Francis | |
| 7,703,673 B2 | 4/2010 | Buchheit et al. | |
| 7,815,506 B2* | 10/2010 | Franklin et al. | 463/25 |
| 8,020,181 B2 | 9/2011 | Koplar et al. | |
| 8,052,518 B1* | 11/2011 | Kelly et al. | 463/25 |
| 8,239,487 B1* | 8/2012 | Hoffman et al. | 709/218 |
| 2002/0112174 A1 | 8/2002 | Yager et al. | |
| 2002/0131565 A1 | 9/2002 | Scheuring et al. | |
| 2003/0126013 A1 | 7/2003 | Shand | |
| 2003/0217002 A1 | 11/2003 | Enborg | |

(Continued)

OTHER PUBLICATIONS

Office Action, mailed Dec. 14, for U.S. Appl. No. 13/178,997, filed Jul. 8, 2011.

(Continued)

*Primary Examiner* — John G Weiss
*Assistant Examiner* — Dipen Patel
(74) *Attorney, Agent, or Firm* — John R. Thompson; Stoel Rives LLP

(57) ABSTRACT

An on-line computer activity is provided to users who generate points through participation. Promotional and incentive offers are displayed simultaneously with the activity to encourage participating users to select and enjoy the offers. Accumulated points may be applied to activate displayed offers to thereby allow participating users to be eligible for offers as sufficient points are accrued. Users are thereby filtered based on interest and willingness to participate.

39 Claims, 3 Drawing Sheets

U.S. PATENT DOCUMENTS

| | | |
|---|---|---|
| 2005/0080748 A1 | 4/2005 | Belobaba et al. |
| 2005/0284930 A1 | 12/2005 | Hefner et al. |
| 2006/0015404 A1 | 1/2006 | Tran |
| 2006/0063587 A1* | 3/2006 | Manzo ............................. 463/25 |
| 2006/0195331 A1 | 8/2006 | Goldthwaite et al. |
| 2006/0277103 A1 | 12/2006 | Fujita et al. |
| 2006/0287898 A1 | 12/2006 | Murishita et al. |
| 2007/0055440 A1 | 3/2007 | Denker et al. |
| 2007/0143155 A1 | 6/2007 | Whitsett et al. |
| 2007/0259709 A1 | 11/2007 | Kelly et al. |
| 2007/0265920 A1 | 11/2007 | Bistriceanu et al. |
| 2008/0040239 A1 | 2/2008 | Jacobi et al. |
| 2008/0091482 A1 | 4/2008 | Whitsett et al. |
| 2008/0224822 A1 | 9/2008 | Gelman et al. |
| 2008/0254893 A1 | 10/2008 | Patel et al. |
| 2008/0274796 A1 | 11/2008 | Lube |
| 2008/0300990 A1 | 12/2008 | Guiton et al. |
| 2008/0306826 A1 | 12/2008 | Kramer et al. |
| 2009/0131143 A1 | 5/2009 | Kelly et al. |
| 2009/0156310 A1* | 6/2009 | Fargo ............................. 463/42 |
| 2009/0171988 A1 | 7/2009 | Kikin-Gil |
| 2009/0177541 A1* | 7/2009 | Martel et al. .................... 705/14 |
| 2009/0216633 A1 | 8/2009 | Whitsett et al. |
| 2009/0276292 A1 | 11/2009 | Inselberg |
| 2009/0287570 A1 | 11/2009 | Adamousky et al. |
| 2009/0292599 A1* | 11/2009 | Rampell et al. ............ 705/14.13 |
| 2010/0018046 A1 | 1/2010 | Pöllabauer |
| 2010/0030578 A1 | 2/2010 | Siddique et al. |
| 2010/0076862 A1 | 3/2010 | Lefkowitz |
| 2010/0078475 A1 | 4/2010 | Lin et al. |
| 2010/0082481 A1 | 4/2010 | Lin et al. |
| 2010/0099485 A1 | 4/2010 | Sommer et al. |
| 2010/0169188 A1 | 7/2010 | Buchheit et al. |
| 2010/0250290 A1 | 9/2010 | Lefkowitz et al. |
| 2010/0260426 A1 | 10/2010 | Huang et al. |
| 2011/0238503 A1 | 9/2011 | Naini |
| 2011/0264474 A1 | 10/2011 | Lefkowitz |
| 2011/0295693 A1* | 12/2011 | Clavin et al. ............... 705/14.66 |

OTHER PUBLICATIONS

International Search Report mailed Jul. 31, 2012 for International Application No. PCT/US2011/065055, filed Dec. 15, 2011.

Article entitled "Increase Web Sales: Convert Facebook Fans Into Customers," by Carrieanne Larmore, web page at http://www.suite101.com/content/e-commerce-strategies-convert-facebook-fans-into-cuto . . . , as available via the Internet and printed Jan. 3, 2011 (15 pgs.).

Office Action mailed Aug. 8, 2011 in U.S. Appl. No. 12/208,236, filed Sep. 10, 2008.

Office Action for U.S. Appl. No. 12/413,321, filed Mar. 27, 2009, and mailed from the USPTO on Oct. 3, 2011, 28 pgs.

Office Action for U.S. Appl. No. 13/681,142, filed Nov. 19, 2012, mailed Jan. 22, 2013.

* cited by examiner

SYSTEMS AND METHODS FOR PROVIDING ACTIVITY AND PARTICIPATION INCENTIVES

TECHNICAL FIELD

This disclosure relates to a system and method for providing interactive computer activities and providing incentives for participating in the activities.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION OF PREFERRED EMBODIMENTS

The disclosed systems and methods provide an on-line computer activity that is likely to be enjoyable to select members of the population. Promotional and incentive offers are displayed simultaneously with the activity to entice participating users to select and enjoy the offers. A point system may be employed to allow participating users to earn points to take advantage of displayed offers. Thus, only users who are willing to participate in the activity are eligible for the offers as sufficient points must be accrued. As disclosed, users are thereby filtered based on interest and willingness to participate.

Figure 1:
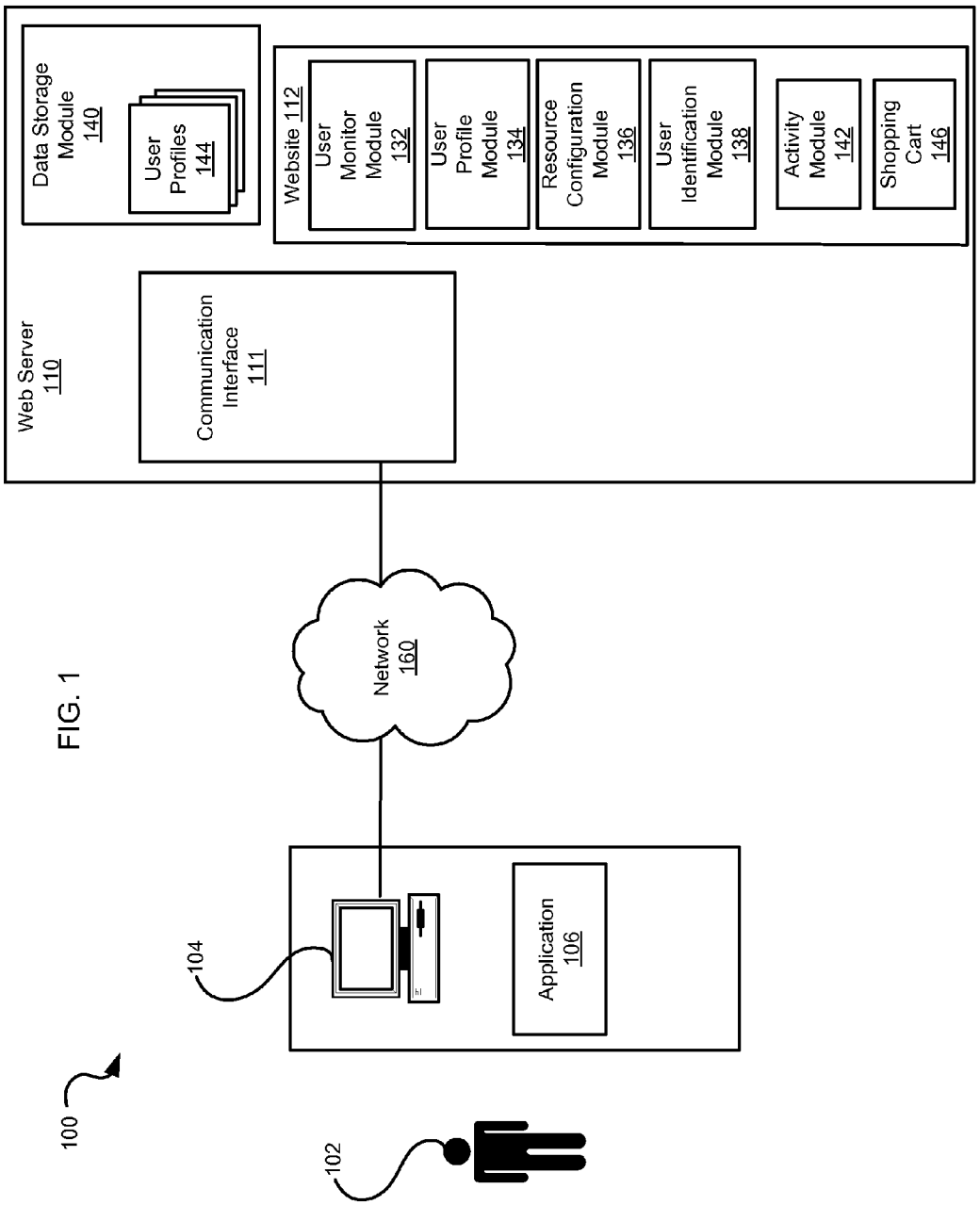
FIG. 1 is a block diagram of one embodiment of a system for providing an interactive computer activity to a user and providing incentive offers.

FIG. 1 is a block diagram of one embodiment of a system 100 for providing an interactive activity for users of a web service (e.g., website). One or more users 102 may be communicatively coupled to a network 160. The users 102 may access the network 160 using respective computing devices 104, which may comprise any computing device known in the art including, but not limited to: a personal computing device (e.g., a personal computer), a portable computing device (e.g., a laptop computer, a notebook computer, or the like), a smart phone (IPhone®, Android®, Blackberry®, or the like), a personal digital assistant (PDA), a set top box (STB), a multi-media appliance, or the like.

Each of the computing devices 104 may comprise a respective web application 106 to access and display content accessible via a network 160. As used herein, a web application refers to any application or process used to access content on a network. Accordingly, a web application may refer to a web browser application, such as Microsoft Internet Explorer®, Mozilla Firefox®, Google Chrome®, Apple Safari®, or the like. A web application may further refer to any other type of application that, although not principally directed to accessing/displaying network content as a web browser, is capable of accessing and/or displaying content from a network. For example, a word processor may be a user agent in the sense that it provides network access features, such as an online help feature, access to online libraries (e.g., clip art libraries, etc.), and the like. Similarly, an online ordering/reservation application may act as a web application by interacting with network accessible storefront/reservation systems. An email client may be referred to as a web application in that it provides access to network data, such as email messages, network content referenced (e.g., linked) therein, and so on.

Web resource(s) and/or web services accessed by the application(s) 106 may comprise content formatted according to the HTML standard (or a related standard). The web resource(s) may be transmitted to the application 106 over the network 160 using the Hyper Text Transfer Protocol (HTTP) standard (or a related standard). However, although HTML content transferred via HTTP is discussed herein, the teachings of this disclosure should not be read as limited to any particular content format and/or communication protocol. As used herein, a web resource may refer to any content that is displayable by a user agent (e.g., content formatted according to the Hyper Text Markup Language (HTML)) standard, or a related standard) and/or a plug-in to the user agent (e.g., content that is displayable by a Flash® virtual machine, a Java® virtual machine, or the like). Accordingly, a web resource may comprise static and/or interactive (e.g., dynamic) text, imagery, audio, video, interface components (e.g., maps, configuration interfaces, etc.), games, editing tools, or the like. As used herein, a web service may refer to any service which is accessible via a network. Examples of web services include, but are not limited to a web site, a web server, an FTP service, a Telnet service, an online help application, an instant messaging service, an email server, a Simple Object Access Protocol (SOAP) service, a Web Service Description Language (WSDL) compliant service, or the like.

The network 160 may comprise any data communication network known in the art including, but not limited to: a transmission control protocol, Internet Protocol (TCP/IP) network, the Internet, a local area network (LAN), a wide area network (WAN), a virtual private network (VPN), a public switched telephone network (PSTN), a wireless network (e.g., IEEE 802.11a-g, Bluetooth, or the like), a combination of networks, or the like.

The users 102 may access a web server 110 using the network 160. The web server 110 may be communicatively coupled to the network 160 using a communication interface 111, which may comprise an Ethernet interface, a wireless communication interface, a PSTN interface, or the like. The web server 110 may further comprise a processor (not shown), a memory (not shown), computer-readable data storage media (not shown), and/or one or more input/output devices (not shown), such as a keyboard, mouse, KVM, or the like.

The processor may comprise any processing means known in the art, such as one or more Intel Core2 Duo® processors, one or more AMD Athlon® processors, and so on. Each of the one or more processors may comprise a plurality of processing cores. In some embodiments, the web server 110 may comprise a plurality of processing modules (not shown), in a blade or similar configuration. Accordingly, the web server 110 may comprise a plurality of computing devices (e.g., servers) operating in a cluster and/or load balancing configuration.

The memory (not shown) may comprise any volatile and/or non-volatile memory known in the art. The computer-readable storage media may comprise one or more discs (e.g., magnetic discs), optical media, distributed media (e.g., in a storage area network (SAN) or the like), or similar devices. The input/output devices may comprise one or more keyboards (not shown), pointing devices (not shown) (e.g., a mouse, track ball, or the like) displays (not shown), KVM connections, or the like.

The web server 110 may further comprise a data storage module 140, which may comprise any memory and/or data storage means known in the art. The data storage module 140 may comprise one or more computer-readable storage media, such as one or more discs, optical media, distributed media (SAN), Flash memory, or the like. As will be discussed below, the data storage module 140 may be used to store one or more user profiles 144 of the users 102.

The web server 110 may comprise an activity and incentive website 112, which may be stored on a computer-readable storage media (not shown) of the web server 110. The website 112 may be configured to provide information to the users 102 in a particular format and/or according to a particular protocol, such as HTTP, or in any other format capable of being consumed by the users 102 (e.g., capable of being read and/or displayed by the user computing devices 104 and rendered by the applications 106 of the respective users 102). As shown in FIG. 1, the website 112 may also include a plurality of distinct modules (e.g., 132, 134, 136, 138, 142, and 146), which may be embodied on a computer-readable storage medium and operable on the server 110.

The website 112 may be customized, meaning that the website 112 may be capable of tailoring the web resource(s) provided to the users 102 according to a "context" (e.g., as embodied by a user context) of the respective user 102. The context of a user 102 may be developed from one or more interactions of the user 102 and/or information stored in a user profile 144. The user profile 144 may include a locale of the user 102, demographics of the user 102, search terms submitted by the user 102, content accessed by the user 102 on the website 112 and/or affiliated websites, other personal information, and the like. In particular, accessed content may include a wide variety of media content including social media such as video, audio, literature, and the like. The user profile 144 may include a browsing history of user's preferences in social media which may be indicative a user's preferences in goods and services. The user profile 144 may also include physical and physiological traits of a user such as age, race, health conditions, and the like. Any data compiled in a user profile 144 may be referred to as a characteristic. A characteristic may be helpful in determining likely user preferences based on aggregated data for a class of users. For example, users in a certain age group may exhibit statistically greater preferences for one type of entertainment over another.

The systems and methods may query a plurality of different storage locations to determine and/or store user profiles 144 and user identifying information. The storage locations include, but are not limited to cookie storage, Flash® storage, virtual machine storage, and the like. As used herein, virtual machine storage may be storage accessible via virtual machine or other plug-in application running in conjunction with the user agent. Flash® is one example of virtual machine storage. However, although Flash® storage is described herein, one skilled in the art would recognize that the teachings of this disclosure could be adapted for use with other virtual machine types, such as a Java® virtual machine, a Microsoft Silverlight® virtual machine, or the like.

The website 112 may include a user monitor module 132, which may monitor and record interactions of users 102 with the website 112. The interactions monitored by the user monitor module 132 may include, but are not limited to: receiving user inputs to the website 112 (e.g., a user 102 may fill in a form on the website, which may indicate user demographics, locale, interests, and the like), monitoring the content (e.g., web resource(s)) accessed by the user 102, monitoring the user's 102 interaction with various interfaces displayed on the website 112, monitoring user search terms input into the website 112 and/or third-party search engine (not shown), determining product related preferences of the user 102, and the like.

The user monitor module 132 may transmit user interaction data indicative of the user's 102 interaction(s) with the website 112 and/or other third-party or affiliated websites to a user profile module 134. The user profile module 134 may aggregate the interaction data of users 102 to develop a user profile 144 therefrom. The contents of the user profile 144 may be used to determine a "context" of a corresponding user 102, which may allow the website 112 (and the resource configuration module 136 discussed below) to tailor the web resource(s) provided to the user 102, according to the user context.

The information input by the user 102 may be detected by the user monitor module 132, which may transmit the user interaction data to the user profile module 134. The user profile module 134 may use the interaction data to refine and/or develop the user profile 144 for the user 102. The content of the website 112 may be customized according to the content of the user profile 144 by the resource configuration module 136. For example, if the user's 102 selections indicated a preference for particular goods or services, advertised offers may be configured to provide incentives for products and/or services likely to be of interest to the user 102. If the user profile 144 indicates a locale of the user 102, the resource configuration module 136 may provide web resource(s) comprising information related to the user's 102 locale, promotions available to residents of the locale, and the like. As will be appreciated by one having skill in the art, any aspect of the web resource(s) provided by the website 112 (e.g., content, layout, theme, graphical assets, links, banner displays, and the like), could be customized according to user context of the user 102 as embodied in a respective user profile 144.

The user profile 144 (and user context information derived therefrom) may allow the resource configuration module 136 to tailor the user experience on the website 112 to the interests of the user 102, to deliver consistent and meaningful communication and incentive offers to the user 102 from initial contact with the website 112 or across a plurality of associated websites. In some embodiments, the user profile 144 may be aggregated and/or shared among a plurality of affiliated websites. This may allow the group of websites to provide consistent, context-aware web resource(s) to the users 102 across the group of websites.

The website 112 may include a user identification module 138 to allow the website 112 to identify incoming users 102 and may provide log-in capability for securely accessing a user account. Identifying users 102 across multiple sessions at the website 112 and/or across multiple visits to affiliated websites (not shown) may allow the website 112 to fully leverage the information embodied in the user profiles 144. For example, the user profiles 144 may include user interaction data occurring over different visits by a user 102 to the website 112. In addition, the user profiles 144 may include interaction data observed at other, affiliated websites (not shown). The user identification module 138 may allow the website 112 to identify users 102 across multiple visits to the website 112 and/or identify users 102 that have previously visited a website affiliated with the website 112 (even if the user 102 has not yet visited the website 112).

The user identification module 138 may be communicatively coupled to the user profile module 134 and to the resource configuration module 136. The user identification module 138 may associate user interaction data with a user profile 144 using a user identifier, which may associate user interaction data with a particular user profile 144 in the data storage module 140. In some embodiments, a substantially unique user identifier value may be used to associate a particular user 102 with a user profile 144.

Similarly, the user identification module 138 may allow the resource configuration module 136 to access a user profile 144 associated with an incoming request (e.g., an HTTP request, such as an HTTP GET, HTTP POST, or the like). This may allow the resource configuration module 136 to obtain a user context associated with the request to allow the resource configuration module 136 to tailor the web resource returned to the user 102, according to the user's preferences (e.g., as embodied in the user profile 144). Similarly, the user identification module 138 may be configured to identify requests from users 102 who have not yet visited the website 112, but have visited a website that is affiliated with the website 112. This may allow the website 112 to obtain user profile and/or context information from the affiliated website, which, as discussed above, may be used to customize the web resource(s) provided to the user 102.

The user identification module 138 may be configured to identify users 102 (e.g., obtain a user identifier associated with the respective users 102) via a plurality of different mechanisms. This may allow the user identification module 138 to reliably identify different users 102, who may employ different applications 106 (e.g., different user agent applications) having different configurations (e.g., proxy settings, security settings, etc.). The user identification module 138 may be configured to identify users 102 with little impact on the user experience at the website 112. As used herein, a user identifier and/or user identifying information may refer to a unique identifier value, which may enable distributed systems to uniquely identify a particular user and/or a particular user agent instance. In some embodiments, a user identifier may be globally unique (e.g., comprise sufficient data and/or randomness, as to be reasonably sure that no two (2) user identifiers will ever collide). Some user identifier values may comprise an authentication credential to allow the user identifier to be tied to a particular user, to a particular user agent application (e.g., web browser instance), a particular computing device, or the like. Such authentication credentials may include, but are not limited to: an Internet Protocol (IP) address, a media access control (MAC) value, a hardware identifier, a user name and password, a personal identification number, a digital signature, or the like.

Users 102 who visit the website 112 may have and/or be assigned a user identifier, which may be a global unique identifier value (GUID). The user identifier (e.g., GUID) may allow the website 112 and/or affiliate websites (not shown) to uniquely identify the user 102. The user identifier may allow the website 112 and/or resource configuration module 136 to lookup a user profile 144 for the user 102 and/or to associate interaction data with a particular user.

In some embodiments, the website 112 may be configured to establish a user identifier for new users 102 (e.g., users who are visiting the website 112 for the first time and have not yet visited a website (not shown) affiliated with the website 112). Alternatively, or in addition, the website 112 may be configured to include user-identifying dynamic content in a web resource returned to the users 102. The user-identifying dynamic content may be configured to find a user identifier value set by the website 112 and/or a website (not shown) affiliated with the website 112. If the user-identifying dynamic content cannot find a previously assigned user identifier, the user-identifying dynamic content may cause a new user identifier value to be generated and stored.

The user identifier may be generated by the user identification module 138 and/or may be generated by the user 102 (e.g., using a client-side script, such as JavaScript or the like). The user identifier may be included in subsequent requests to the website 112 (e.g., as a URL parameter, first-party cookie, HTTP header, or the like). In some embodiments, the website 112 and/or user identification module 138 may also cause the user 102 to store the user identifier in storage location, such as a cookie, a global first-party cookie, a third-party cookie, in Flash® storage, in virtual machine storage, or the like. The storage location may allow an affiliated website to access the user identifier of the user 102.

The user identifier may be included on subsequent requests to the website 112 (e.g., as a URL parameter, HTTP header, cookie, or the like). The user identifier may allow the website 112 and/or resource configuration module 136 to tailor content for the user 102 according to the user context 142 (e.g., derived from a respective user profile 144). Accordingly, through the user identifier, the website 112 and/or resource configuration module 136 may be customized according to preferences of a user 102. In some embodiments, the website 112 and/or resource configuration module 136 may be configured to embed the user identifier into the web resource(s) returned to the user 102. For instance, outbound links in the web resource may be modified to include the user identifier (e.g., in outbound links, in FORM fields, or the like). Alternatively, or in addition, the web resource may comprise one or more dynamic elements (e.g., client-side executable scripts, such as JavaScript) to rewrite the outbound links and/or forms in the web resource to include the user identifier and/or to dynamically append the user identifier to output links and/or form submissions.

When a new user accesses the website 112 (e.g., via a link on an affiliated website (not shown), a search engine result, a sponsored link, a banner advertisement, or the like), the user identification module 138 may be configured to determine whether the user 102 has previously visited the website 112 and/or an affiliated website (not shown). For instance, the user identification module 138 may detect an incoming HTTP request 108 from a user 102. If the message 108 includes a user identifier, the user identification module 138 may verify the identifier (e.g., verify that the user identifier corresponds to a stored user profile 144 on the website 112 or an affiliate website (not shown)). If the request 108 includes a valid user identifier, the user identification module 138 may forward the message 108 to the website 112 and/or the resource configuration module 136, which may generate a context-aware web resource 138 for the user.

The website 112 may access one of a plurality of storage mechanisms available, such as a global cookie, Flash® storage, virtual machine storage, and the like, to confirm the user identify, user profile and the like. In some embodiments, the user-identifying dynamic content in the web resource 138 may filter the storage locations to be queried according to the type of the user's 102 application 106 and/or version of the application 106. Alternatively, or in addition, the dynamic content in the web resource 138 may be configured to obtain additional content (e.g., graphical assets and the like) for display to the user 102 responsive to obtaining the user identifier. The additional resources may include content to customize the user's experience according to the user context, such as a user locale, user preferences, and the like.

The user-identifying dynamic content in the web resource may query a series of storage mechanisms for a user identifier. In some embodiments, the storage mechanisms queried by the user-identifying dynamic content may be ordered according to a likelihood that the mechanism will produce a result (e.g., based on a likelihood that the mechanism will be supported by the application 106 and/or will yield a result).

Various techniques for tracking user activity may include use of browser cookies, cross-domain (e.g., third-party) cookies, JavaScript, virtual machine storage (e.g., Flash® storage), and the like which may allow a group of affiliated websites to provide a consistent marketing message and/or user experience across the website group. The affiliated websites may be configured to include user identification information in a storage location that may be accessible to other members of the group, such as a third-party cookie.

The website 112 further includes an activity module 142 to generate and manage user activities. The activity may include any number of games, including puzzles, arcade-type games, games-of-chance, strategy games, trivia games, and the like. Participation in the activity may be enabled through conventional keyboard, mouse, and touch-screen interaction. The activity is intended to provide an enjoyable experience for the user 102 and the activity may be selected based on the user's profile. Thus, participating users may participate in different activities based on various preferences including age, recreational preferences, and the like.

The activity module 142 may monitor the time of user participation and any thresholds of accomplishment. The activity module 142 may then reward a user 102 based on participating time and/or meeting activity thresholds by generating activity points which may be redeemed for rewards. The activity points may be referred to within the system by any arbitrary or fanciful term. The activity points may be credited to a user's account and may be accumulated over multiple activity sessions. The activity points may also be rewarded upon the user 102 agreeing to set up a user account and provide user information which is submitted to the user profile. For example, a user 102 may be rewarded 500 points for any initial participation, 500 points for setting up a user account, and 500 points for providing an email. A user 102 may be rewarded additional activity points if the user is willing to participate in a survey and provide additional user information, all of which may be submitted in a user profile 144.

The activity module 142 may further provide a user one or more incentive offers. The incentive offer may be prominently displayed as a discount, coupon, or full purchase value for a related good or service. An incentive offer may be redeemed by exchanging a user's accumulated activity points for the offer. The incentive offer may be displayed next to the activity on a webpage of the website 112 to encourage user selection. Thus, the incentive offer is displayed simultaneously with the operation of the activity. The incentive offer may have redeemable values based on the user's current activity point totals or may be redeemable with a slight increase in activity point totals. As noted, the incentive offer may be a coupon or discount for a good or service. For example, the incentive offer may be for a percentage reduction in food and/or beverages, discounted hotel stay, discounted travel, free slot plays, discounted live theater, and the like.

The good or service related to the offer may also be selected based on the user profile 144 to increase the likelihood of selection of the offer. Thus, the good or service may be based on likely preferences as determined by a user's age, selection of media content, travel reservation history, nationality, income bracket, education, residential address, work address, or any one of a number of characteristics. The user preferences may also be determined by a user 102 directly indicating certain preferences such as by completing a survey. The good or service may be based on multiple user characteristics in a user profile. For example, a service may be for a personally attended event in the user's residential locale and be based on additional user's preferences. The activity module 142 may also select the good or service based on likely preferences for users with similar profiles. The incentive offer may be displayed in a variety of graphical formats and multiple incentive offers may be displayed sequentially to a user 102. The incentive offer may also have an expiration date for redemption which may be prominently displayed on the offer. As such, a user 102 would be required to redeem the offer within the pre-established time.

If an incentive offer is selected, the corresponding activity points are reduced and the offer is deposited in a user's account. In one embodiment, the website 112 includes a shopping cart 146 which manages on-line user transactions. The shopping cart 146 records entry of the offer and notes the expiration date. If the incentive offer is a discount or coupon, then money may be further required to purchase the good or service. The shopping cart 146 may be configured to receive the item(s) to be purchased, apply the discount or coupon, and charge a user for the remaining amount owed.

In one embodiment, a user 102 may activate the shopping cart 146 and view an icon, or other graphical representation, relating to the discount or coupon. The graphical representation may only be displayed if the offer is before the expiration date. If the discount or coupon is selected, then the user 102 may be queried if the user 102 wishes to apply the coupon and purchase the good or service. If the user 102 responds in the affirmative, the good or service is deposited in the shopping cart 146 and the shopping cart prompts for additional transaction information such as payment information, shipping information (if applicable), and the like. If the discount or coupon is applicable to multiple goods or services, then a link may be provided to a webpage that allows a user to select the good or service. For example, if the service is a time-sensitive event requiring a reservation, then the user may need to select the available date and time. Selected goods or services may then be deposited in the shopping cart 146 and the user may proceed with the on-line transaction.

Figure 2:
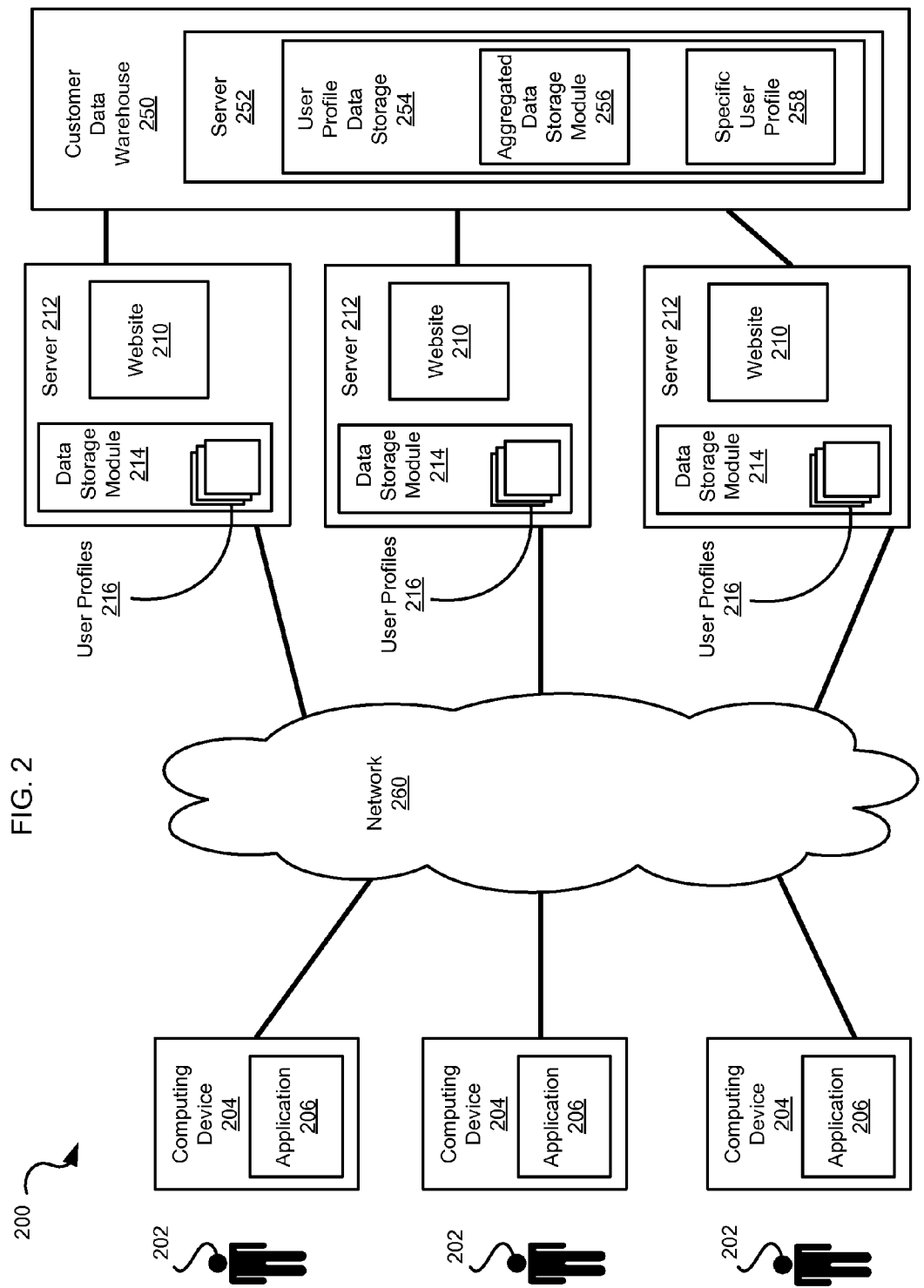
FIG. 2 is a block diagram of one embodiment of a system having a network of computers for providing interactive computer activities and incentive offers.

Referring to FIG. 2, a system 200 is shown with one or more users 202 that may be communicatively coupled to a network 260 via respective computing devices 204 comprising respective applications 206. The users 202 may access one of a plurality of websites 210 over the network 260 hosted on one or more servers 212. The network 260 may include a transmission control protocol, Internet Protocol (TCP/IP) network, the Internet, a local area network (LAN), a wide area network (WAN), a virtual private network (VPN), a public switched telephone network (PSTN), a wireless network (e.g., IEEE 802.11a-g, Bluetooth, or the like), a combination of networks, or the like. Each server 212 may comprise one or more computing devices and include a processor (not shown), memory (not shown), data storage media (not shown), one or more communications interfaces (not shown), input/output devices (not shown), and the like. A server 212 may include a data storage module 214, on which is stored one or more user profiles 216. Each user profile 216 may comprise user context information (e.g., user preferences, demographics, locale, interests, etc.) of a respective user 202. The computing devices 204, applications 206, websites 210 and servers 212 may be otherwise embodied as described in reference to FIG. 1.

The websites 210 may have some form of common affiliation (e.g., franchises of a product and/or service provider, marketing group, industry association, contractual agreement, etc.). The modules comprising the website (e.g., the user monitor module, resource configuration module, and/or user identification module, activity module, and/or shopping cart module) may be operable on the respective server and/or embodied on a computer-readable storage medium.

A server 212 may be operated by one organization, such as first resort, and a second server 212 may be operated by a second, affiliated resort, or even a competing resort under a agreement. Corresponding websites 210 may be seamlessly accessed by users 202 without regard to the hosting entity.

The websites 210 may further be configured to track user activity therebetween. As such, a user context (embodied as a user profile 244) aggregated from user interaction data obtained by a first one of the plurality of affiliated websites 210 may be used to tailor the user experience at a second one of the plurality of affiliated websites 210. Therefore, the user experience across the affiliated websites 210 may be consistent as the websites 210 customize content for the individual users 202.

One or more of the affiliated websites 210 may monitor and record interactions of the users 202 on the respective affiliated website 210. The website 210 may transmit user interaction data to a respective server 212 which derives user context information and updates user profiles 216.

The servers 212 may be in electrical communication with a customer data warehouse 250 which may include a server 252 with a user profile data storage 254 which may comprise an aggregated data storage module 256. The customer data warehouse 250 receives user profiles from the servers 212 and compiles them into the aggregated data storage module 256. As discussed, the servers 212 may be operated by one or more affiliated or competing entities. The entities may agree to share some or all of the user profile data in order to compile the information into the aggregated data storage module 256 and thereby provide an aggregate database of user profiles. Participating entities may then access aggregated user profiles at one location.

The aggregated user profiles may be compiled and presented without specific user information. For example, a user's name and contact information may be removed. Nevertheless, the aggregated user profiles are beneficial in providing information on user preferences for certain demographics. In analyzing aggregated user profiles, appropriate incentive offers may be matched to a user 102 participating in an activity. For example, if the aggregated user profiles indicate that people from 35 to 45 in age prefer hotels of a certain chain or in a certain location, then incentive offers for those hotels may be provided to those corresponding users participating in an activity. In this manner, participating users may be targeted with appropriate incentive offers.

The user profile data storage 254 may also include a warehouse of specific user profiles 258. The specific user profiles 258 are not aggregated and contain profiles corresponding to unique individuals. Access to the specific user profiles 258 may be granted to participating entities based on established policies and rules. The policies and rules may be dynamic to accommodate the changing market conditions and relationships between participating entities. A participating entity may be granted access to a specific user profile and view information that an affiliated entity or even a competing entity has provided on the specific user. From this additional information, increased user profiling occurs and superior targeting of incentive offers is possible. As discussed herein, an entity may be a human individual, an organization such as an affiliation of participants, a legal entity such as a corporation, partnership, limited liability company, and the like.

A specific user profile 258 includes identification of the user 102 and may include contact information and a variety of demographic data. The specific user profile 258 may include a history of a user's travel reservations, including airline reservations, hotel and resort reservations, ticketed events, dining reservations, and the like. As can be appreciated, incentive offers may be provided to participating users 102 based on demographic data and specific user preferences. For example, if a user 102 frequently dines at Italian restaurants at a first resort, a participating second resort may provide an incentive offer for another Italian restaurant at their resort. Where the resorts are in different travel markets, such cooperation may be deemed mutually beneficial.

The specific user profile 258 may also include live time information on a user 102. For example, the live time information may include where the user 102 is presently checked into a hotel, the current rental car reservations, return air travel reservations, what dining reservations the user may hold for the current day, and what ticketed events the user may have in the next 48 hours. As can be appreciated, these are exemplary points of live time information and the full scope of such information is far broader. Based on a user's current travel and recreational plans, incentive offers may be provided that are convenient and attractive to a user. A user 102 presently staying at a hotel may be provided with incentive offers for establishments in or proximate to the hotel. For example, an incentive offer may include gaming incentives for a casino in or proximate to the hotel, dining incentives near a ticketed event, discounted beverages in a bar proximate to any location that a user 102 will frequent in their travel plans, and the like. The specific user profiles 258 may also include information on upcoming travel plans and appropriate incentive offers may be provided in a like manner.

Figure 3:
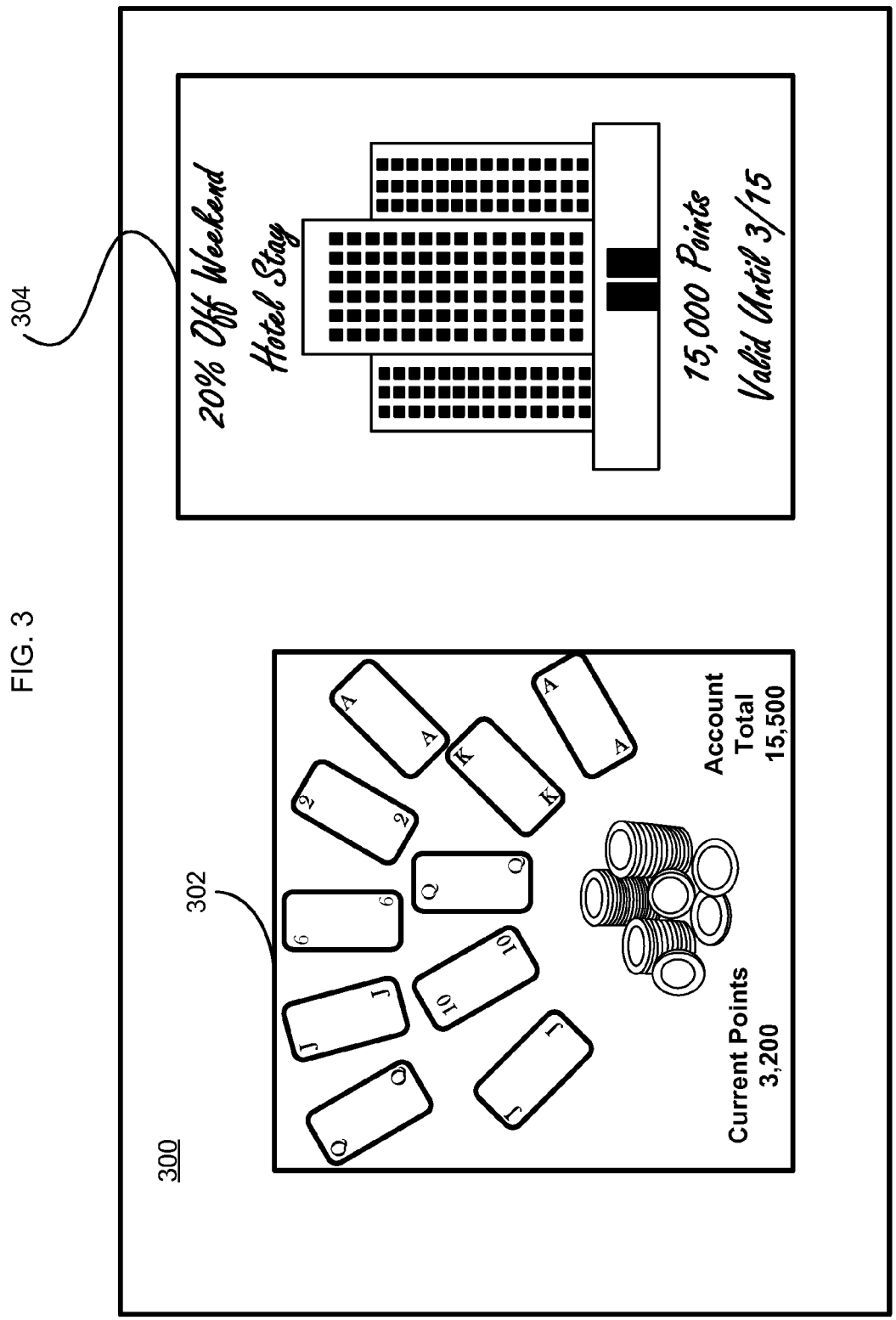
FIG. 3 illustrates one embodiment of a user interface provided by the systems in FIG. 1 or 2.

Referring to FIG. 3, an embodiment is shown of a user interface on a webpage 300 of the website 112. One of skill in the art will appreciate that the displayed activity 302 and the incentive offer 304 may generated in a variety of graphical formats. The activity 302 allows for real time interaction of a user based on received inputs to activity prompts. As discussed above, the activity may include games-of-chance, such as a roulette wheel, poker, black jack, bingo, and the like. The activity may include puzzles such as word games, fitting objects with shapes and sizes, brain teasers, and the like. The activity may include any number of arcade games ranging from Pacman to first person shooters. The activity may also include simple tabletop games such as battleship or tic-tac-toe.

The activity 302 may display a running activity point total for the present session. The activity 302 may also display a user's total activity points in a user's account. The activity 302 may reward activity points based on time participation and/or reaching certain thresholds such as successfully completing a puzzle, winning a hand of poker, solving a word riddle, finishing an arcade game level, and the like. The activity 302 may also reward additional activity points based on exceptional skill, part of a promotion, i.e. all points on a certain day will be doubled, or even based on random chance. The activity 302 may further reward activity points if a user purchases activity points or otherwise uses money to invest in the activity 302. For example, if a user may pay money to upgrade the activity in some fashion or to improve the user's chances of winning a threshold level in the activity. Investing money in the activity 302 may also entitle the user to an increase in activity points.

Participation in the activity 302 may require user registration, entry of user profiling data, a registration fee, and the like. In one embodiment, a user may be rewarded with activity points for entry of user profiling data and/or a registration fee. Alternatively, a registration fee may not be required so as to increase the volume of user participation. The activity module

142 may prompt for specific user profiling data and offer activity points. For example, the activity module 142 may prompt for a user's email address and offer 5,000 activity points. If the user 102 declines, the activity module 142 may again prompt the user 102 for this information at a later time, such as before or after an activity or as an intermission during an activity.

The incentive offer 304 may be displayed in proximity to the activity 302 and simultaneously with participation with the activity 302. The incentive offer 304 may include one or more offers that are available to the user 102 based on the user's current activity point total. Furthermore, the incentive offer 304 may include offers that require activity points in excess of a user's current activity point total to encourage a user 102 to continue participation. As discussed, the incentive offers may be for the purchase of goods and services completely based on activity points and may also be for discounts and coupons for goods and services. The incentive offers may also encourage a user 102 to purchase additional items at non-discounted prices. For example, an odd number of ticketed seats for a theater event may encourage a user 102 to buy an additional ticketed seat to arrive at an even number. As another example, a discounted hotel stay on a Friday night may encourage a user 102 to stay the Saturday night as well. One of skill in the art will appreciate that a variety of options are available to encourage increased user transactions.

The provided activity and incentive offer may be based on a user profile. The user profile may be selected if a user is required to log-in to participate or by user tracking. An aggregated data storage module 256 may be accessed to determine likely preferences for a user 102 with corresponding demographic information. A specific user profile 258 may be accessed by the system to enable targeting of incentive offers. Furthermore, the webpage 300 may display one or more advertisements based on a user profile.

It is contemplated that merchants providing the goods and services may pay for participation in the disclosed system. Thus, merchants pay the system provider a fee to have their respective coupons listed as incentive offers. Alternatively, a merchant may provide a good or service in order to participate in the disclosed system. For example, a theater event provider may provide a certain number of ticketed seats for selected venues. The system provider may enroll the ticketed seats as part of the inventory for incentive offers. The incentive offer may be for a discounted ticketed seat and a user 102 would still be required to pay some amount of money for the ticketed seat. Money payment from the user would then be used to reimburse the system provider.

Merchants providing and honoring the incentive offers may also earn the right to provide incentive offers through a bidding process. Merchants may make offers to the system provider and the system provider may reward the right to make an incentive offer to the highest bidder. Bidding may be for the right to provide offers to a subset of users 102, such as those falling into a certain demographic category. For example, bidding may be for offers to users 102 within a certain income level, certain preferences, certain ages, and the like. Bidding may also be for the right to make offers for specific users 102 who uniquely qualify for such attention.

In addition to generating incentive offers based on profiling and demographic information contained therein, incentive offers may be based on physical appearance. An entity may take digital images of a user 102 and commit them to a data storage module, such as the data storage module 214 in a server. This may occur, for example, when a user 102 is frequenting an entity's establishment such as a night club, resort, casino or the like. The entity may take and store the digital image with the user's consent by offering the user 102 a free copy of the image, prominently displaying the image on the property, offering a promotion, and the like. The user 102 may be asked to provide an email or other contact information to receive a copy of the image. The user's contact information and digital information may be used to establish or update a user profile 216. Thus, a plurality of user profiles 216 may also contain one or images of a profiled user 102.

The images in a user profile 216 may be scanned manually or through use of image recognition software to filter users 102. Participating entities may then provide incentive offers to selected users 102 to encourage users 102 to visit respective establishments, properties, and the like. For example, social clubs and similar evening entertainment establishments wish to encourage visitation of attractive people to increase the reputation of their property. In offering incentives and promotions to selected users, a greater portion of the selected users will likely attend. Many social venues depend on popularity and prestige of their customers and will appreciate that increased traffic offered by the disclosed system. Venues include physical establishments such as resorts, hotels, casinos, restaurants, social clubs, dance halls, amusement parks, and the like and which are operated by service providers participating in some manner in the systems and methods disclosed herein. A service provider may provide an incentive offer to any one of a number of goods or services offered at the venue.

Incentive offers to selected users 102 may be provided according to the systems and techniques disclosed herein, such as through simultaneously displaying the incentive offer with an activity. Alternatively, incentive offers may be mailed or emailed to users 102 where contact information is available.

Participating entities may opt to share images in user profiles 216 with other affiliated and even competing entities. Enticement for sharing may be arranged through mutual exchange of user profiles, monetary compensation, exchange of goods and/or services and the like. Entities may directly exchange user profiles 216, including images, or transmit such information to the database warehouse. Participating entities may then access the database warehouse and review specific user profiles and then filter images. Selected images from the database warehouse may then be used as recipients for incentive offers.

Participation in the activity 302 filters the users 102 who will be eligible for the incentive offer. In this manner, only users 102 with interests in the provided activity are likely to participate and take advantage of the listed associated offer. Thus, an activity for a game-of-chance is likely to entice users 102 who enjoy recreational gaming. Incentive offers associated with casinos will be more readily received and enjoyed. An activity for an arcade game will likely entice teenage users 102 and corresponding incentive offers would include popular teenage activities.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable non-transitory and tangible medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

What is claimed is:

1. A computer-readable non-transitory storage medium comprising instructions to cause a computing device to perform a method of providing an activity and an incentive offer, the method comprising:
   generating a computer activity offering user participation on the computing device;
   generating activity points for a user account corresponding to the user based on the user participation of the activity;
   simultaneously displaying an incentive offer with the computer activity, the incentive offer relating to a tangible good or tangible service and being redeemable only upon reaching a predetermined activity point value, the incentive offer displaying a description of the tangible good or tangible service and the activity point value; and
   reducing the activity points by the activity point value upon selection of the incentive offer by the user.

2. The computer-readable non-transitory storage medium of claim 1, wherein the method further comprises:
   accessing a user profile corresponding to the user participating in the activity; and
   selecting an incentive offer based on the user profile.

3. The computer-readable non-transitory storage medium of claim 2, wherein accessing the user profile includes accessing a database shared by a plurality of entities providing incentive offers corresponding to different physical locations.

4. The computer-readable non-transitory storage medium of claim 2, wherein accessing the user profile includes accessing a database used exclusively by a single entity providing incentive offers.

5. The computer-readable non-transitory storage medium of claim 2, wherein the user profile includes an image of the user and selecting the incentive offer is based on the image.

6. The computer-readable non-transitory storage medium of claim 1, wherein the method further comprises:
   accessing a characteristic of the user participating in the activity;
   accessing aggregated user profile data; and
   selecting an incentive offer based on a comparison of the user characteristic and the user profile data.

7. The computer-readable non-transitory storage medium of claim 1, wherein the method further comprises:
   logging a user into a user account; and
   displaying an account total of activity points generated from a plurality of activity participation sessions.

8. The computer-readable non-transitory storage medium of claim 7, wherein the method further comprises:
   accessing a user profile corresponding to the user account; and
   selecting an incentive offer based on the user profile.

9. The computer-readable non-transitory storage medium of claim 1, wherein the method further comprises placing the incentive offer in a shopping cart corresponding to the user.

10. The computer-readable non-transitory storage medium of claim 9, wherein the incentive offer further requires monetary payment and the method further comprises receiving monetary payment to complete a transaction for the incentive offer.

11. The computer-readable non-transitory storage medium of claim 9, wherein the incentive offer includes an expiration date and wherein the method further comprises invalidating the incentive offer at the expiration date.

12. The computer-readable non-transitory storage medium of claim 1, wherein simultaneously displaying the incentive offer with the computer activity includes displaying the incentive offer and the activity on a web browser.

13. The computer-readable non-transitory storage medium of claim 1, wherein the method further comprises receiving compensation from an entity for the right to provide an incentive offer to the user.

14. The computer-readable non-transitory storage medium of claim 13, wherein the compensation includes money.

15. The computer-readable non-transitory storage medium of claim 13, wherein the compensation includes an offer for a tangible good or a tangible service.

16. The computer-readable non-transitory storage medium of claim 1, wherein the method further comprises:
   receiving bids from entities for the right to provide an incentive offer to the user; and
   awarding the right to an entity.

17. The computer-readable non-transitory storage medium of claim 1, wherein generating activity points is further based on the time the user participates in the activity.

18. The computer-readable non-transitory storage medium of claim 1, wherein generating activity points is further based on the user reaching a threshold within the activity.

19. A computer system to perform a method of providing an activity and an incentive offer, comprising:
a processor;
a computer-readable non-transitory storage medium comprising distinct modules operable on the computer system, wherein the modules include an activity module,
the activity module configured to generate a computer activity offering user participation on the computing device;
the activity module to generate activity points for a user account corresponding to the user based on the user participation of the activity;
the activity module to simultaneously display an incentive offer with the computer activity, the incentive offer relating to a tangible good or tangible service and only redeemable upon reaching a predetermined activity point value, the incentive offer displaying a description of the tangible good or tangible service and the activity point value; and
the activity module to reduce the activity points by the activity point value upon selection of the incentive offer by the user.

20. The computer system of claim 19 further comprising a user profile module configured to access a user profile corresponding to the user participating in the activity, and the activity module is further configured to select an incentive offer based on the user profile.

21. The computer system of claim 20 wherein the user profile module is further configured to access a database shared by a plurality of entities providing incentive offers corresponding to different physical locations.

22. The computer system of claim 20, wherein the user profile module is further configured to access a database used exclusively by a single entity providing incentive offers.

23. The computer system of claim 20, wherein the user profile includes an image of the user and selecting the incentive offer is based on the image.

24. The computer system of claim 19, wherein the modules further include a user profile module configured to access a characteristic of the user participating in the activity and access aggregated user profile data, and the activity module is further configured to select an incentive offer based on a comparison of the user characteristic and the user profile data.

25. The computer system of claim 19, wherein the activity module is further configured to log a user into a user account and display an account total of activity points generated from a plurality of activity participation sessions.

26. The computer system of claim 25, wherein the modules further include a user profile module configured to access a user profile corresponding to the user account, and the activity module is further configured to select an incentive offer based on the user profile.

27. The computer system of claim 19, wherein the modules further include a shopping cart module configured to receive and store an incentive offer corresponding to the user.

28. The computer system of claim 27, wherein the shopping cart module is further configured to receive monetary payment to complete a transaction for the incentive offer.

29. The computer system of claim 27 wherein the activity module is further configured to provide an expiration date for the incentive offer and the shopping cart is further configured to invalidate the incentive offer at the expiration date.

30. The computer system of claim 19, wherein simultaneously displaying the incentive offer with the computer activity includes displaying the incentive offer and the activity on a web browser.

31. The computer system of claim 19, wherein the activity module is further configured to receive compensation from an entity for the right to provide an incentive offer to the user.

32. The computer system of claim 31, wherein the compensation includes money.

33. The computer system of claim 31, wherein the compensation includes an offer for a tangible good or a tangible service.

34. The computer system of claim 19, wherein the activity module is further configured to receive bids from entities for the right to provide an incentive offer to the user and award the right to an entity.

35. The computer system of claim 19, wherein the activity module is further configured to generate activity points based on the time the user participates in the activity.

36. The computer system of claim 19, wherein the activity module is further configured to generate activity points based on the user reaching a threshold within the activity.

37. The computer-readable non-transitory storage medium of claim 1, wherein the method further comprises: selecting the incentive offer based on a current total of activity points within the user account.

38. The computer-readable non-transitory storage medium of claim 1, wherein the incentive offer is only redeemable using activity points from the user account.

39. A computer-readable non-transitory storage medium comprising instructions to cause a computing device to perform a method of providing an activity and an incentive offer, the method comprising:
generating a computer activity offering user participation on the computing device;
generating activity points for a user account corresponding to the user based on the user participation of the activity;
simultaneously displaying an incentive offer, the computer activity, and a current total of activity points within the user account, the incentive offer displayed as a description of the tangible good or tangible service and the activity point value; and
reducing the activity points within the user account by the activity point value upon selection of the incentive offer by the user,
wherein the incentive offer relates to a tangible good or tangible service and is redeemable only upon reaching a predetermined activity point value within the user account and only through redemption of activity points from the user account.

\* \* \* \* \*